US010679360B2

(12) United States Patent
Dai et al.

(10) Patent No.: US 10,679,360 B2
(45) Date of Patent: Jun. 9, 2020

(54) MIXED MOTION CAPTURE SYSTEM AND METHOD

(71) Applicant: Beijing Noitom Technology Ltd., Beijing (CN)

(72) Inventors: Ruoli Dai, Beijing (CN); Haoyang Liu, Beijing (CN); Longwei Li, Beijing (CN); Jinzhou Chen, Beijing (CN); Baojia Gui, Beijing (CN); Haotian Chen, Beijing (CN)

(73) Assignee: Beijing Noitom Technology Ltd., Beijing (CN)

( * ) Notice: Subject to any disclaimer, the term of this patent is extended or adjusted under 35 U.S.C. 154(b) by 218 days.

(21) Appl. No.: 15/817,373

(22) Filed: Nov. 20, 2017

(65) Prior Publication Data

US 2018/0089841 A1 Mar. 29, 2018

Related U.S. Application Data

(63) Continuation-in-part of application No. PCT/CN2015/079346, filed on May 20, 2015.

(51) Int. Cl.
*G06T 7/277* (2017.01)
*G01P 15/18* (2013.01)
(Continued)

(52) U.S. Cl.
CPC ............. *G06T 7/277* (2017.01); *G01D 21/02* (2013.01); *G01P 3/38* (2013.01); *G01P 15/08* (2013.01);
(Continued)

(58) Field of Classification Search
CPC .... A61B 2034/2048; A61B 2034/2055; G06K 9/00348; G06T 2207/20024;
(Continued)

(56) References Cited

U.S. PATENT DOCUMENTS 8,203,487 B2 6/2012 Hol et al.
9,396,385 B2 * 7/2016 Bentley .................. G11B 27/17
(Continued)

FOREIGN PATENT DOCUMENTS

| CN | 102706336 A | 10/2012 |
| CN | 103279186 A | 9/2013 |
| CN | 104267815 A | 1/2015 |

OTHER PUBLICATIONS

English Translation of Chinese patent No. 103279186 A, pp. 1-17. (Year: 2013).*
(Continued)

*Primary Examiner* — Daniel G Mariam
(74) *Attorney, Agent, or Firm* — Syncoda LLC; Feng Ma

(57) ABSTRACT

A mixed system for capturing motions of an object and its use method is disclosed. The mixed system includes at least one inertial sensor module and at least one optical marker mounted on the object, and at least two optical cameras. Each inertial sensor module measures inertial information and spatial attitude information, and each optical camera captures image information of the at least one optical marker. Based on the collected information, a receiving processor respectively generates inertia-based position information and optics-based position information, and further integrates the above information to obtain position information of the object. Integration may involve assignments of different weights to the inertia-based position information and the optics-based position information based on respective measurement errors of the at least one optical marker and the at least one inertial sensor module. The inertia-based position information may be corrected based on biomechanical constraints and/or external constraints.

19 Claims, 9 Drawing Sheets

(51) Int. Cl.
  *G01P 3/38*   (2006.01)
  *G01D 21/02*  (2006.01)
  *G06T 7/70*   (2017.01)
  *G01P 15/08*  (2006.01)
  *G01P 15/14*  (2013.01)
(52) U.S. Cl.
  CPC .............. *G01P 15/14* (2013.01); *G01P 15/18* (2013.01); *G06T 7/70* (2017.01); *G06T 2207/20024* (2013.01); *G06T 2207/30204* (2013.01)
(58) Field of Classification Search
  CPC . G06T 2207/30204; G06T 7/277; G06T 7/70; G01D 21/02; G01P 15/08; G01P 15/14
  USPC .................. 382/103, 107, 236, 291; 348/135
  See application file for complete search history.

(56) References Cited

U.S. PATENT DOCUMENTS

| | | | |
|---|---|---|---|
| 2010/0194879 A1* | 8/2010 | Pasveer | A61B 5/1127 348/135 |
| 2013/0028469 A1 | 1/2013 | Lee et al. | |
| 2013/0064427 A1* | 3/2013 | Picard | G01S 5/163 382/103 |

OTHER PUBLICATIONS

International Search Report and Written Opinion in PCT/CN2015/079346 dated Feb. 14, 2016.

\* cited by examiner

MIXED MOTION CAPTURE SYSTEM AND METHOD

CROSS-REFERENCE TO RELATED APPLICATION

The present application is a continuation-in-part application of, and claims priority to, International Application No.: PCT/CN2015/079346, filed on May 20, 2015, the disclosure of which is hereby incorporated by reference in its entirety.

TECHNICAL FIELD

This disclosure relates generally to the field of motion capture technologies, and more specifically to a mixed motion capture system and method.

BACKGROUND

In recent years, the motion capture technologies have been widely applied in the capture and analysis of players' motions in sports. Typically, a motion capture technology can digitally record the motions of an object. Currently, the motion capture technologies that are commonly employed include an optics-based motion capture technology and an inertial sensor-based motion capture technology.

An optics-based motion capture technology typically includes a plurality of cameras, which are arranged around an object under measurement, and the object is further configured to have a range of movement in an overlapped area of the perspectives of the plurality of cameras. Typically, a plurality of special reflective points or luminous points (i.e. optical markers) are attached onto some key parts of the object to thereby serve as markers allowing for visual identification and data processing.

After calibration, each camera is configured to continuously photograph the motions of the object and to record image sequences for further analysis and processing. Based on the image sequences, a spatial position of each optical marker at each moment can be calculated, thereby allowing for an accurate determination of the motion tracks of the object.

The optics-based motion capture technology involves no mechanical devices or cables, and are thus free from their restrictions, which allows the object to have a relatively larger range of movement, and further allows a relatively higher sampling frequency. However, by means of the above optics-based motion capture technology, the motion of the object can be captured only when the object's motion is within the overlapped area of the cameras' perspectives. In addition, when the motion of the object is complex, the optical markers can be easily blocked and cause confusions, resulting in erroneous results.

Conventionally, mechanical inertial sensors have long been employed in the navigation of aircrafts and ships. With the rapid development of microelectromechanical systems (MEMS), the micro inertial sensor technology has become relatively mature, and in recent years, people have attempted to employ the MEMS inertial sensor technology in motion captures.

One basic approach is to couple or attach an inertial measurement unit (IMU) onto an object to be measured, which thus moves along with the object. The inertial measurement unit usually includes a MEMS accelerometer and a MEMS gyroscope, which are configured to measure an acceleration signal and an angular velocity signal (i.e. a gyro signal) respectively. Based on a double integration of the acceleration signal and an integration of the gyro signal, the position information and the orientation information of the object can be obtained.

Due to the application of MEMS technology, the IMU can have a small size and a light weight, thus having little influence on the movement of the object to be measured. In addition, the MEMS-based IMU has a low requirement for the activity field, and is typically not affected by lights and shades (or blocks), thus allowing for a relatively large range of movement for the object. Nonetheless, the integration drift that is intrinsically associated with the inertia-based motion capture technology has resulted in a relatively low motion capture accuracy.

U.S. Pat. No. 8,203,487 discloses a motion capture system and method that combines ultra-wideband (UWB) measurements and MEMS-based inertial measurements. According to the disclosure, the motion capture system includes: 1) a sensor unit, comprising a plurality of UWB transmitters and a plurality of inertial measurement sensors; 2) a plurality of UWB receivers, configured to receive, remotely from the object, data from each of the plurality of UWB transmitters to thereby obtain the time of arrival (TOA) of each inertial measurement sensor, wherein the plurality of UWB transmitter and the plurality of inertial measurement sensors are synchronized at the hardware level; and 3) a processor, configured to receive the TOA data and the inertial data, and to integrate the TOA data and the inertial data to obtain the position and orientation of an object to be measured.

In this above motion capture system that combines the use of UWB and inertial measurement sensors, primarily due to a relatively poor positioning accuracy of UWB, even though the combination of inertial measurement sensors and the employment of certain arithmetic processing allows the motion trajectory captured to be relatively smooth, they cause limited improvement to the positioning accuracy.

In addition, a UWB device can only be employed in positioning on a horizontal plane, and cannot be used for positioning in the vertical direction. Although the aforementioned motion capture system further includes a pressure sensor (barometer) in an attempt to solve the issue, the pressure sensor itself has a relatively low positioning accuracy.

Furthermore, the motion capture system as described above requires a plurality of UWB receivers. Thus in cases where the scene for motion capture needs to be changed, a relatively longer time is needed to set up and calibrate the various devices in the system.

U.S. patent application (Pub No. US20130028469A1) substantially discloses the combination of optical markers with inertial sensors for capturing the position and orientation of an object. A marker determining unit is utilized to determine a position of a marker in a two-dimensional (2D) image. A depth determining unit is utilized to determine, in a depth image, a position corresponding to the position of the marker in the 2D image, and to determine a depth of the corresponding position in the depth image to be a depth of the marker. A marker-based estimator is utilized to estimate, based on the depth of the marker, a marker-based position indicating a three-dimensional (3D) position of the marker.

At the same time, an inertial sensor unit is further utilized to obtain an inertia-based position and an inertia-based orientation. Ultimately a fusion estimator can be used to estimate a fused position and an inertia-based orientation, based on a weighted-sum of the marker-based position and the inertia-based position, where the weighted-sum is calculated based on a movement speed and a position of the object, the inertia-based position, and the inertia-based orientation.

The motion capture technology as described above is only able to capture the motion of a single node, but is unable to capture the complex motions of an object having multiple nodes or joints.

SUMMARY OF THE INVENTION

In light of the issues of the current motion capture technologies, the present disclosure provides a mixed motion capture system and a mixed motion capture method.

In a first aspect, a mixed motion capture system for capturing motions of an object is disclosed. The mixed motion capture system includes a receiving processor, at least one inertial sensor module, at least one optical marker, and at least two optical cameras. The at least one inertial sensor module is mounted on the object, each wirelessly coupled to the receiving processor and configured to obtain, and to send to the receiving processor, inertial information and spatial attitude information thereof.

The at least one optical marker is also mounted on the object. The at least two optical cameras are arranged in a surrounding region of the object, each coupled to the receiving processor and configured to photograph, and to send to the receiving processor, image information of each of the at least one optical marker.

The receiving processor is configured to generate inertia-based position information based on the inertial information and the spatial attitude information from each of the at least one inertial sensor module, to generate optics-based position information based on the image information from each of the at least one optical marker, and to integrate the inertia-based position information and the optics-based position information to thereby obtain position information of the object.

In the mixed motion capture system, each of the at least one inertial sensor module can comprise a three-axis MEMS accelerometer, a three-axis MEMS gyroscope, a three-axis MEMS magnetometer, a first CPU, and a first radio frequency (RF) transceiver coupled to the first CPU.

The three-axis MEMS accelerometer is configured to measure acceleration information; the three-axis MEMS gyroscope is configured to measure angular velocity information thereof; and the three-axis MEMS magnetometer is configured to obtain terrestrial magnetic vector information thereof.

The first CPU is coupled with each of the three-axis MEMS accelerometer, the three-axis MEMS gyroscope, and the three-axis MEMS magnetometer, and is configured to generate dynamic spatial orientation information by integrating the angular velocity information, to generate static absolute spatial orientation information based on the acceleration information and the terrestrial magnetic vector information, and to utilize the static absolute spatial orientation information to correct the dynamic spatial orientation information to thereby generate spatial attitude information.

The first radio frequency (RF) transceiver is configured to transmit the spatial attitude information and inertial information comprising the acceleration information and angular velocity information to the receiving processor.

In the mixed motion capture system as described above, the mixed motion capture system can further include at least one inertial marker. Each inertial marker can comprise one of the at least one inertial sensor module and one of the at least one optical marker integrated therein.

In the mixed motion capture system, the receiving processor is further configured to correct the inertia-based position information based on at least one of a biomechanical constraint and an external constraint to thereby generate corrected inertia-based position information, and to obtain the position information of the object by integrating the corrected inertia-based position information and the optics-based position information.

In the mixed motion capture system as described above, during integration of the corrected inertia-based position information and the optics-based position information, the receiving processor is configured, if any one of the at least one optical marker is blocked or any two of the at least one optical marker is overlapped to one another, to generate the position information of the object based on the corrected inertia-based position information; or else to obtain a measurement error a of the at least one optical marker and a measurement error b of the at least one inertial sensor module, to calculate a weight A for the optics-based position information and a weight B for the corrected inertia-based position information based on the measurement error a and the measurement error b respectively, and to generate the position information of the object based on the weight A and the weight B.

According to some embodiments of the mixed motion capture system, the weight A and the weight B are calculated based on the following formulas:

$$A = \frac{|b|}{|a| + |b|};$$

$$B = \frac{|a|}{|a| + |b|}.$$

According to some other embodiments of the mixed motion capture system, wherein the receiving processor is configured to estimate the measurement error a and the measurement error b in a real-time manner by means of a filtering algorithm.

Herein the filtering algorithm can be Kalman filtering algorithm, but can also be other filtering algorithm.

According to some embodiments of the mixed motion capture system, the at least one optical marker comprises at least one reflective passive optical marker.

According to some other embodiments of the mixed motion capture system, the at least one optical marker comprises at least one luminous active optical marker, which can comprise an infrared illuminator.

According to some embodiments of the mixed motion capture system, the at least two cameras comprise a plurality of separately disposed monocular cameras, each fixedly arranged, or mounted onto a tripod disposed in a surrounding region of the object.

According to some other embodiments of the mixed motion capture system, the at least two cameras comprise at least one binocular camera or at least one multiocular camera, fixedly arranged, or mounted onto a tripod disposed, in a surrounding region of the object.

In a second aspect, the disclosure further provides a mixed motion capture method utilizing the mixed motion capture system according to any embodiment as described above.

The mixed motion capture method includes the following steps:

generating the inertia-based position information based on the inertial information and the spatial attitude information measured by each of the at least one inertial sensor module and the optics-based position information based on the image information of the at least one optical marker captured by each of the at least two optical cameras; and integrating the inertia-based position information and the optics-based position information to thereby obtain the position information of the object.

According to some embodiments of the mixed motion capture method, the step of generating the inertia-based position information based on the inertial information and the spatial attitude information measured by each of the at least one inertial sensor module and the optics-based position information based on the image information of the at least one optical marker captured by each of the at least two optical cameras comprises the following sub-steps:

generating the inertia-based position information based on the inertial information and the spatial attitude information measured by each of the at least one inertial sensor module; and generating the optics-based position information based on the image information of the at least one optical marker captured by each of the at least two optical cameras.

In the mixed motion capture method as described above, the sub-step of generating the inertia-based position information based on the inertial information and the spatial attitude information measured by each inertial sensor module comprises:

generating calculated inertia-based position information through a double integration over the acceleration information in the inertial information; and correcting the calculated inertia-based position information based on at least one of a biomechanical constraint and an external constraint to thereby generate corrected inertia-based position information;

As such, the step of integrating the inertia-based position information and the optics-based position information to thereby obtain the position information of the object comprises the sub-step of:

integrating the corrected inertia-based position information and the optics-based position information to thereby obtain the position information of the object.

In the mixed motion capture method as described above, the sub-step of integrating the corrected inertia-based position information and the optics-based position information to thereby obtain the position information of the object comprises:

generating the position information of the object based on the corrected inertia-based position information if any one of the at least one optical marker is blocked or any two of the at least one optical marker is overlapped to one another; or else obtaining a measurement error a of the at least one optical marker and a measurement error b of the at least one inertial sensor module, calculating a weight A for the optics-based position information and a weight B for the corrected inertia-based position information based on the measurement error a and the measurement error b respectively, and generating the position information of the object based on the weight A and the weight B.

According to some embodiments of the mixed motion capture method, the weight A and the weight B are calculated based on:

$$A = \frac{|b|}{|a|+|b|};$$

$$B = \frac{|a|}{|a|+|b|}.$$

According to some other embodiments of the mixed motion capture system, the obtaining a measurement error a of the at least one optical marker and a measurement error b of the at least one inertial sensor module comprises:

estimating the measurement error a and the measurement error b in a real-time manner by means of a filtering algorithm.

Herein the filtering algorithm can be Kalman filtering algorithm, but can also be other filtering algorithm.

Herein throughout the disclosure, a system is defined as a combination of hardware and/or software components, each of which has a special functionality. A system can comprise a set of hardware devices, each of a special functionality, or can comprise a software, stored in a memory in a computing device (e.g. a computer, or a server in a cloud) and configured to perform a special functionality by means of the computing device.

A module is defined as a device, an apparatus, a device assembly having multiple devices, or an apparatus assembly having multiple apparatus. The device, the apparatus, or each device in the device assembly, or each apparatus in the apparatus assembly can perform a certain functionality.

BRIEF DESCRIPTION OF DRAWINGS

To more clearly illustrate the technical solutions provided by the various embodiments of the invention disclosed herein, the following is a brief description of the drawings for some of the embodiments. It is noted that the drawings and the accompany descriptions are only illustrative of some embodiments. For those of ordinary skill in the art, other drawings of other embodiments can become apparent based on these drawings.

DETAILED DESCRIPTION OF THE INVENTION

Figure 1:
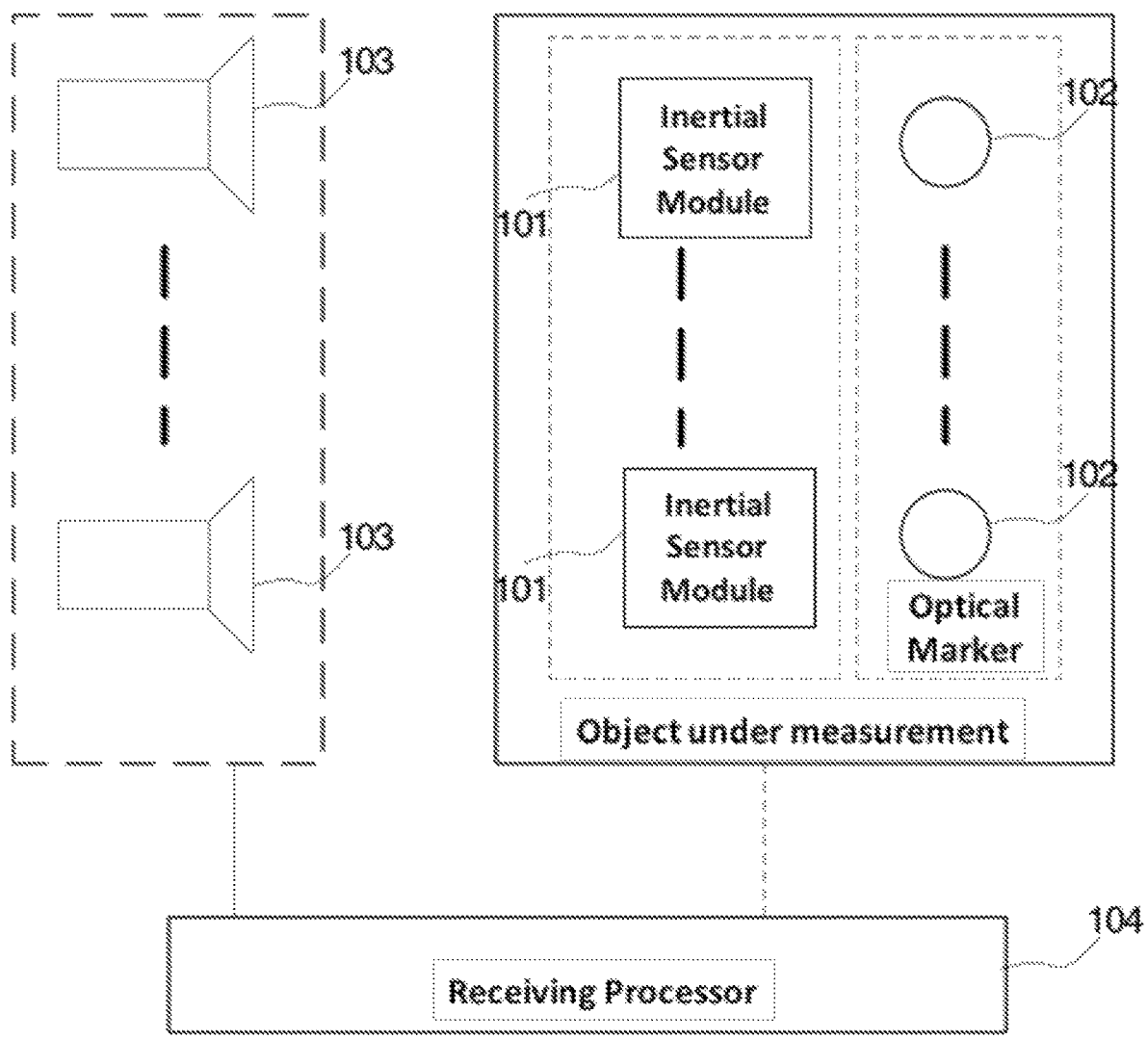
FIG. 1 illustrates a structural diagram of a mixed motion capture system according to a first embodiment of the disclosure.

With reference to the various embodiments of the invention as illustrated in the drawings that forego, the following is a detailed description of the invention. It is obvious that the described embodiments shall represent merely some, but not all, of the embodiments of the disclosure. Based on the described embodiments of the disclosure, those ordinarily skilled in the art can obtain other embodiment(s), which shall come within the scope sought for protection by the disclosure.

In a first aspect, the present disclosure provides a mixed motion capture system, as illustrated in FIG. 1. The mixed motion capture system comprises at least one inertial sensor module 101, at least one optical marker 102, at least two optical cameras 103, and a receiving processor 104.

The at least one inertial sensor module 101 is wirelessly coupled or connected to the receiving processor 104 by, for example, a radio frequency (RF) transceiver. Each of the at least two optical cameras 103 is coupled to the receiving processor 104 in a wired or wireless manner. Each of the at least one inertial sensor module 101 and each of the at least one optical marker 102 is respectively mounted on an object to be measured.

The at least one inertial sensor module 101 can include more than one inertial sensor module 101, each mounted at a different position on the object (i.e. on a different part of the object). Each inertial sensor module 101 can measure, and transmit to the receiving processor 104, inertial information and spatial attitude information of its own.

The at least one optical marker 102 can include more than one optical marker, each mounted at a different position on the object (i.e. on a different part of the object). Each of the at least two optical cameras 103 is fixedly arranged in a surrounding area of the object, and is configured to photograph, and to transmit to the receiving processor 104, image information from each of the at least one optical marker 102 mounted at the different position of the object.

Upon receiving the above mentioned inertial information and spatial attitude information from each inertial sensor module 101 and the image information from each optical marker 102, the receiving processor 104 is configured to generate inertia-based position information according to the inertial information and spatial attitude information of the each inertial sensor module 101, to generate optics-based position information according to the image information from the each optical marker 102, and then to fuse or integrate the inertia-based position information and the optics-based position information to thereby obtain position information of the object.

In the mixed motion capture system disclosed herein, each of the at least one inertial sensor module 101 can collect the inertial information and spatial attitude information; and each of the at least two optical cameras 103 can obtain the image information from each of the at least one optical marker 102.

Next based on the inertial information and the spatial attitude information transmitted from each of the at least one inertial sensor module 101, the receiving processor 104 can generate inertia-based position information; and based on the image information transmitted from each of the at least two optical cameras 103, the receiving processor 104 can generate optics-based position information.

Then after integrating the inertia-based position information and the optics-based position information, the receiving processor 104 can generate the position information for the object.

Through the above configuration, the mixed motion capture system disclosed herein can substantially combine the respective advantages of, while at the same time can avoid the respective shortcomings of, the optical motion capture technology and of the inertial motion capture technology.

Figure 2:
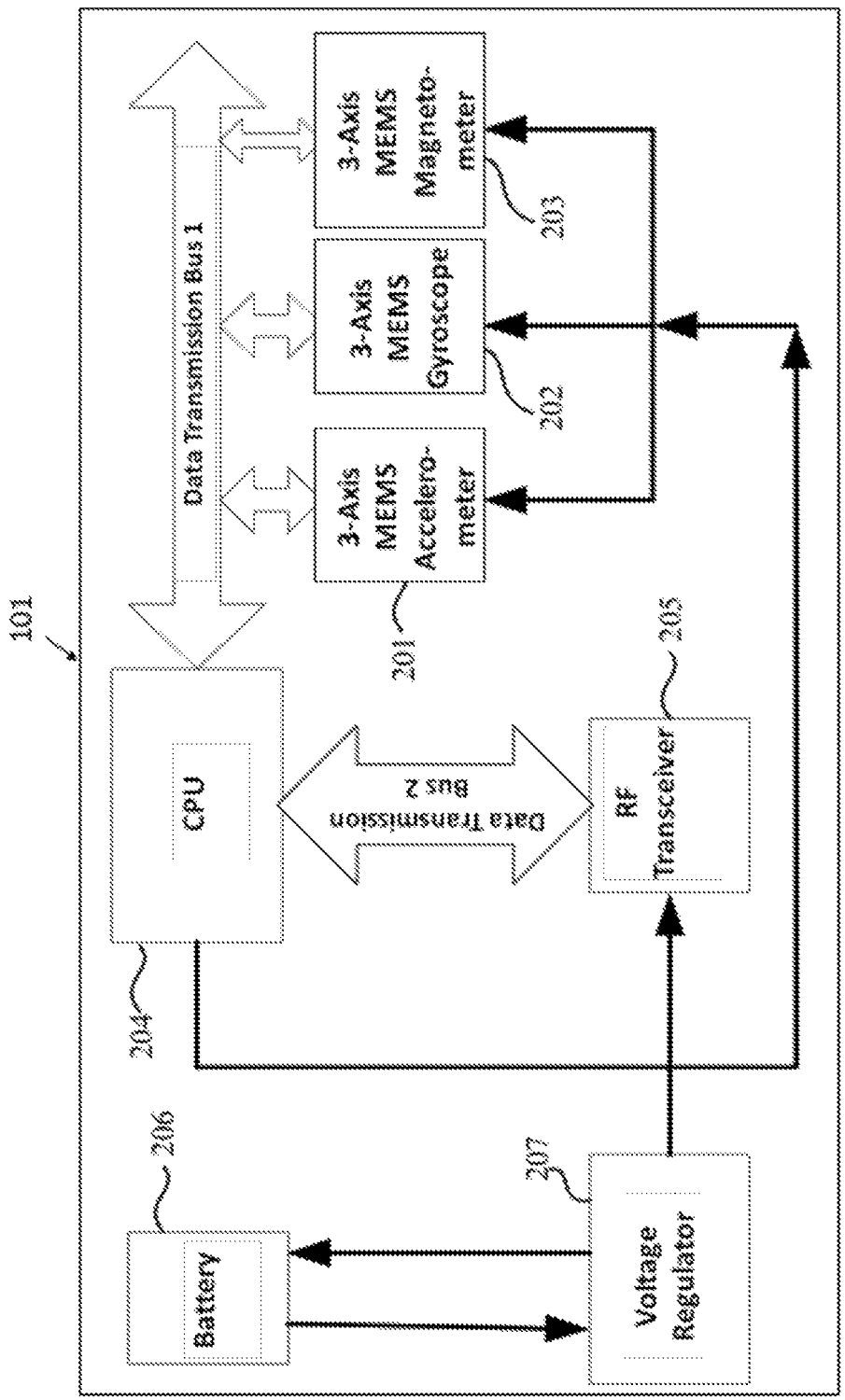
FIG. 2 illustrates a structural diagram of an inertial sensor module 101 according to some embodiments of the disclosure.

FIG. 2 illustrates an inertial sensor module 101 in the mixed motion capture system according to some embodiments of the disclosure. As shown in the figure, the inertial sensor module 101 includes: a three-axis MEMS accelerometer 201, a three-axis MEMS gyroscope 202, and a three-axis MEMS magnetometer 203, a CPU 204 (termed the first CPU 204 hereafter), and a RF transceiver 205 (termed the first RF transceiver 205 hereafter).

The three-axis MEMS accelerometer 201 is configured to measure acceleration information of the inertial sensor module 101; the three-axis MEMS gyroscope 202 is configured to measure angular velocity information of the inertial sensor module 101; and the three-axis MEMS magnetometer 203 is configured to obtain terrestrial magnetic vector information of the inertial sensor module 101.

The first CPU 204 is coupled with each of the three-axis MEMS accelerometer 201, the three-axis MEMS gyroscope 202, and the three-axis MEMS magnetometer 203.

The first CPU 204 is configured to integrate the angular velocity information measured by the three-axis MEMS gyroscope 202 to thereby generate dynamic spatial orientation information of the object, based on the following integral formula:

$$\theta_T = \theta_0 + \int_0^T \omega_t dt;$$

where $\theta_T$ and $\theta_0$ are each a spatial orientation, and $\omega_t$ is an angular velocity. Thus by calculation using the above formula, the dynamic spatial orientation of the object can be obtained.

The first CPU 204 is also configured to generate static absolute spatial orientation information of the object based on the acceleration information measured by the three-axis MEMS accelerometer 201 and the terrestrial magnetic vector information detected by the three-axis MEMS magnetometer 203.

The first CPU 204 is further configured to utilize the static absolute spatial orientation information to correct the dynamic spatial orientation information, and to thereby generate spatial attitude information of the inertial sensor module 101, which is substantially also the spatial attitude information of the part of the object on which the inertial sensor module 101 is mounted.

The first RF transceiver 205 is coupled to the first CPU 204, and is configured to transmit the spatial attitude information of the object and the inertial information measured from the inertial sensor module 101 to the receiving processor 104. According to some embodiments, the inertial information includes acceleration information and angular velocity information.

Further as illustrated in FIG. 2, the inertial sensor module 101 can further include a battery 206 and a voltage regulator 207. The battery 206 is configured to provide a power source, and the voltage regulator 207 is configured to adjust a voltage inputted from the battery and to then output a voltage to power the first RF transceiver 205.

According to some embodiments, the inertial sensor module 101 can further include a first data transmission bus and a second data transmission bus (shown respectively as "Data Transmission Bus 1" and "Data Transmission Bus 2" in FIG. 2). The first data transmission bus is configured to allow the transmission of data between the first CPU 204 and each of the three-axis MEMS accelerometer 201, the three-axis MEMS gyroscope 202, and the three-axis MEMS magnetometer 203, and the second data transmission bus is configured to allow the transmission of data between the first CPU 204 and the first RF transceiver 205.

Figure 3:
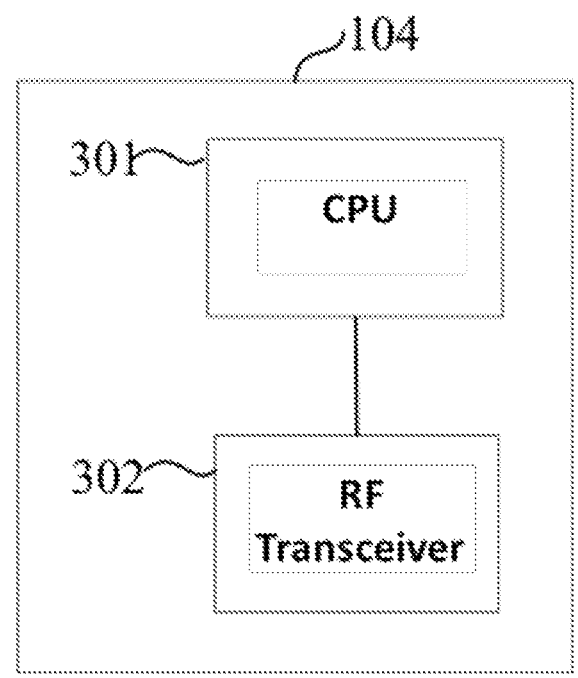
FIG. 3 illustrates a structural diagram of a receiving processor 104 according to some embodiments of the disclosure.

FIG. 3 illustrates a receiving processor. As shown in the figure, the receiving processor 104 comprises a CPU 301 (termed the second CPU 301 hereafter) and a RF transceiver 302 (termed the second RF transceiver 302 hereafter). The second CPU 301 is coupled to the second RF transceiver 302 by a wired connection.

The second RF transceiver 302 is wirelessly coupled to the first RF transceiver 205, and is configured to receive, and then to send to the second CPU 301, the inertial information and the spatial attitude information transmitted from the first RF transceiver 205.

The second CPU 301 is configured, upon receiving the inertial information and the spatial attitude information, to first generate calculated inertia-based position information based on the acceleration information in the inertial information by a double-integration formula:

$$P_T = P_0 + \int_0^T v_0 dt + \iint_0^T a_t dt^2;$$

where P represents displacement, v is velocity, a is acceleration, T is termination time, 0 is initial time, and t is intermediate time.

In actual implementation, in order to make the calculated inertia-based position information more accurate, the calculated inertia-based position information needs to be corrected or modified based on constraints that have been known.

According to some embodiments, the mixed motion capture system is configured for capture motions of a human body, and the known constraints include biomechanical constraints (e.g. the articulated constraints) and/or external constraints (e.g. the contact with the ground constraints on the position information). As such, the calculated inertia-based position information is corrected or modified based on these above mentioned constraints to thereby generate corrected inertia-based position information.

In one embodiment using a bone of a human wearing the mixed motion capture system as an illustrating example, a correction formula for biomechanical constraints is expressed as:

$$P = P_a + K(P_\theta - P_a);$$

where $P_a$ is a displacement of the bone calculated based on the double-integration formula over the acceleration information; $P_\theta$ is a displacement of the same bone calculated based on the relationship among bones, the spatial orientation of each bone, and the spatial position of each base point; and K is a scale factor calculated based on the Kaman filtering algorithm or other approaches, whose size depends on the relative size of an error between $P_a$ and $P_\theta$.

In the above embodiment, only the biomechanical constraints associated with bone-bone connection is utilized for the correction of the displacement, other biomechanical constraints, such as the degrees of freedom for each joint, and the range of relative movement among bones, etc., are skipped herein. Through the biomechanical constraint correction as described above, it is known that such a correction requires the use of the spatial attitude information, which includes information regarding spatial orientation of each bone, and information regarding the spatial position of each base point.

A correction formula for external constraints is expressed as:

$$P' = P + (P_o - P_c);$$

where P' is a corrected displacement of a part of the body, P is a calculated displacement of the part of the body before correction, $P_c$ is a calculated displacement of a part of the body contacting the environment at a contacting point before correction, $P_o$ is a displacement of the environment surrounding the contact point.

For example, if the human body is determined to stand on one foot (i.e. only one foot touches the ground), the calculated displacement of the foot touching the ground ($P_c$) needs to be discounted from the displacement of the ground surrounding the contact point ($P_o$), and difference of the displacement ($P_o - P_c$) is fed back to the calculated displacements of each part of the body (P), to thereby obtain the corrected displacement of the whole body.

It is noted that this displacement correction approach as described above can also be applied to the correction of velocity of the whole body having contacts with the floor, as well as to the corrections having other types of contacts with the surrounding environment.

The second CPU 301 is further configured, upon receiving the image information from the at least one optical marker 102, to generate optics-based position information based on the image information. In this process, by means of the at least two optical cameras 104 to obtain the image information of each of the at least one optical marker 102 from different angles, the spatial coordinates for each moment for each of the at least one optical marker 102 can be obtained, which are then combined to thereby obtain the optics-based position information of each of the at least one optical marker 102.

The second CPU 301 is further configured to integrate, or fuse, the inertia-based position information and the optics-based position information to generate the position information of the object under measurement.

Under some situations, for example, if any one of the at least one optical marker 102 is blocked or any two of the at least one optical marker 102 is overlapped or stacked to one another, the approach for integrating the inertia-based position information and the optics-based position information is to generate the position information of the object under measurement based on the corrected inertia-based position information.

If the position information for each of the at least one optical marker 102 is able to be obtained, an estimate of the position information of the object under measurement can be generated based on both the inertia-based position information and the optics-based position information.

The approach for generating the estimate is as follows: the optics-based position information is given a weight A based on a measurement error a of the at least one optical marker, and the inertia-based position information is given a weight B based on a measurement error b of the at least one inertial sensor module. Herein, the position information having a relatively smaller measurement error is give a relatively heavier weight, and the position information having a relatively bigger measurement error is give a relatively lighter weight.

It is noted that the method to generate the estimate of the position information of the object under measurement based on the weight A for the optics-based position information and weight B for the inertia-based position information is known to people of ordinary skills in the field and is skipped herein.

In one specific embodiment, the respective measurement errors a and b for the at least one optical marker and the at least one inertial sensor module can be first estimated, which are then utilized to calculate the weights A and B for the optics-based position information and the inertia-based position information, respectively. As such, the weights A and B can be calculated based on the following formulas:

$$A = \frac{|b|}{|a|+|b|} \quad (1)$$

$$B = \frac{|a|}{|a|+|b|} \quad (2)$$

where a is the measurement error for the optical marker-based system (i.e. the at least one optical marker), and b is the measurement error for the inertia-based system (i.e. the at least one inertial sensor module).

It is noted that the calculation of the weights A and B is not limited to the above approach, and can be calculated by any approach known to people of ordinary skills in the field, which will be skipped herein.

In another embodiment, the respective measurement errors a and b for the optical marker-based system (i.e. the at least one optical marker) and the inertia-based system (i.e. the at least one inertial sensor module) can be first estimated in a real-time manner by means of a filtering algorithm (e.g. Kalman filtering algorithm, etc.), which are then utilized to calculate the respective weights A and B for the optics-based position information and the inertia-based position information in a real-time manner. The calculation for the weights can also utilize the formula (1) and (2).

It is noted that because optics-based measurement has a relatively smaller measurement error compared with inertia-based measurement, the optics-based position information is commonly given a heavier weight. As such, when and if each of the at least one optical marker 102 is visible to the optical camera 103, the displacement of the object gradually approaches the optics-based position information; when and if there is a block or overlap for the at least one optical marker 102 which causes the optics-based position information to be unavailable, the weight for the optics-based position information is given as 0, and the displacement of the object is solely based on the inertia-based position information.

Because there could be situations where any one of the at least one optical marker 102 is blocked or any two of the at least one optical marker 102 is overlapped or stacked to one another, if the motion capture of an object under measurement is based only on optics-based position information, it is unable to obtain an accurate position information of the object. By means of the inertia-based position information, the above disadvantages of the optics-based position information can be complemented to thereby allow an acquisition of an accurate position information of the object.

Figure 4:
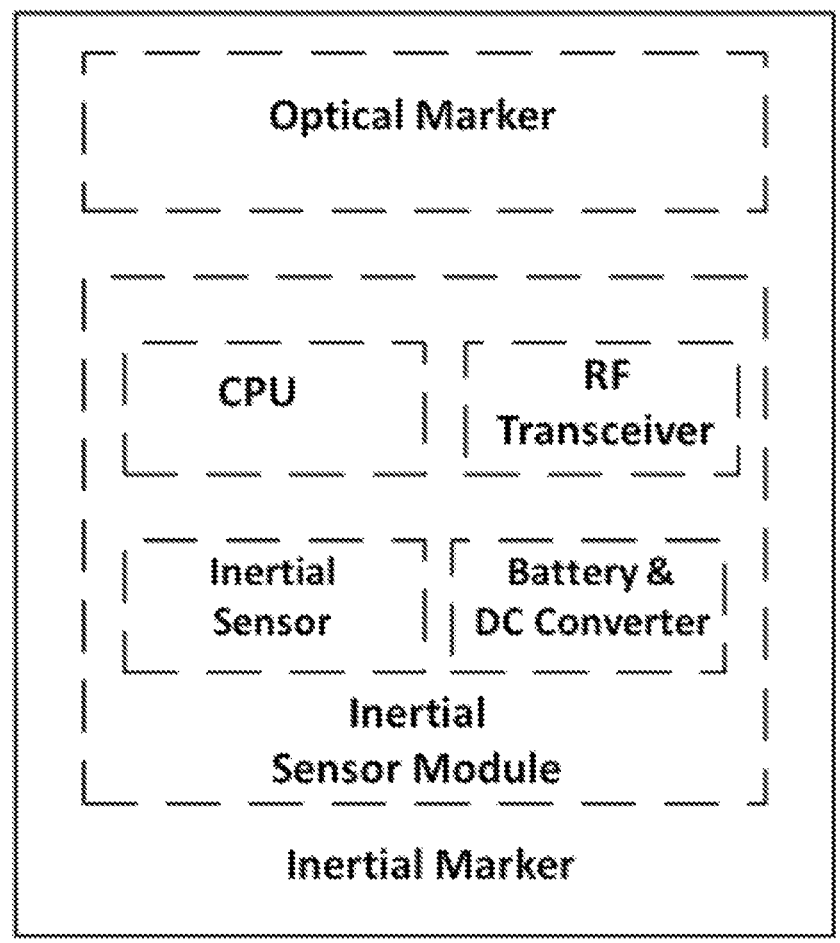
FIG. 4 illustrates a structural diagram of an inertial marker according to some embodiments of the disclosure.
Figure 5:
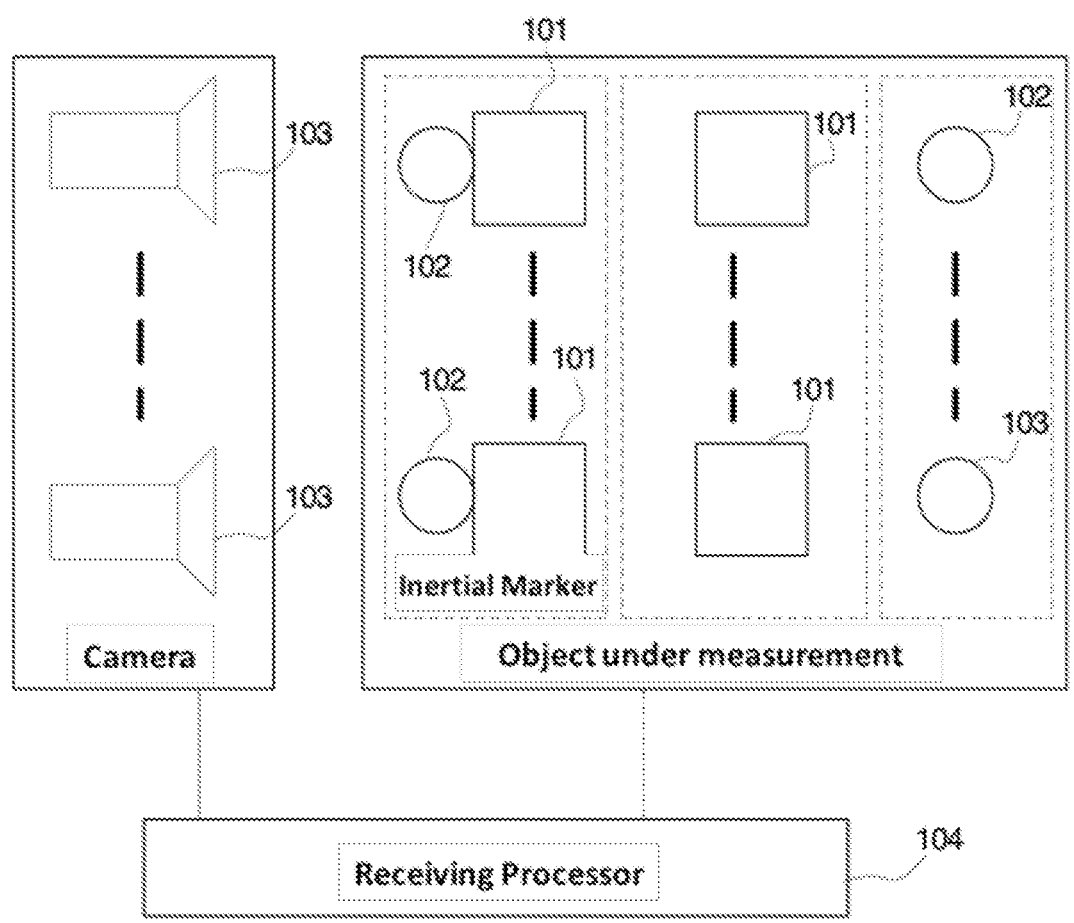
FIG. 5 illustrates a structural diagram of a mixed motion capture system according to a second embodiment of the disclosure.

The embodiment of the mixed motion capture system as illustrated in FIG. 1 includes a plurality of inertial sensor modules 101 and a plurality of optical markers 102. One inertial sensor module 101 and one optical marker 102 can be integrated into an inertial marker, as illustrated in FIG. 4 and FIG. 5.

A mixed motion capture system can include more than one inertial marker.

Specifically, a mixed motion capture system can include at least one inertial marker, a plurality of inertial sensor modules 101, and a plurality of optical markers 102; or can include at least one inertial marker and a plurality of inertial sensor modules 101; or can include at least one inertial marker and a plurality of optical markers 102; or can include a plurality of inertial markers; or can include a plurality of inertial sensor modules 101 and at least one optical marker 102, and so on. There are no limitations herein.

In any of the embodiments of the mixed motion capture system, each of the at least one optical marker 102 can be a reflective passive optical marker, such as a reflective marker; or can be a luminous active optical marker, such as an infrared illuminator.

Each of the at least two optical cameras 103 can be arranged in a region far away from the object under measurement. According to some embodiments, each optical camera 103 can include a plurality of separately disposed monocular cameras, which can be fixedly arranged, or can be mounted onto tripods that are disposed, in some specific fields of the area.

According to some other embodiments, each optical camera 103 can include at least one binocular camera or at least one multiocular camera, which can be fixedly mounted, or can be mounted onto tripods that are disposed, in some specific fields of the area.

Figure 6:
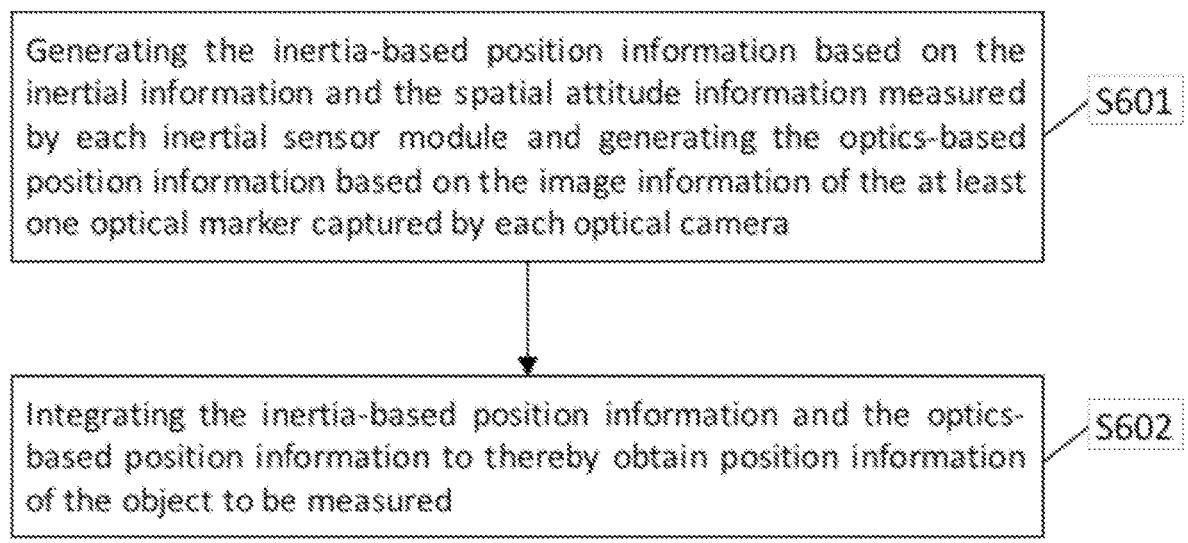
FIG. 6 illustrates a flow chart of a mixed motion capture method utilizing the aforementioned mixed motion capture system according to some embodiments of the disclosure.

In another aspect, the disclosure further provides a mixed motion capture method utilizing the mixed motion capture system as described above, which is illustrated in FIG. 6. As shown in the figure, the mixed motion capture method includes the following steps:

S601: generating the inertia-based position information based on the inertial information and the spatial attitude information measured by each inertial sensor module and the optics-based position information based on the image information of the at least one optical marker captured by each optical camera; and S602: integrating the inertia-based position information and the optics-based position information to thereby obtain position information of the object to be measured.

According to some embodiments, step S601 comprises the following sub-steps:

S6011: generating the inertia-based position information based on the inertial information and the spatial attitude information measured by each inertial sensor module; and S6012: generating the optics-based position information based on the image information of the at least one optical marker captured by each optical camera.

According to some other embodiments, step S601 comprises the following sub-steps:

S6011': generating the optics-based position information based on the image information of the at least one optical marker captured by each optical camera; and S6012': generating the inertia-based position information based on the inertial information and the spatial attitude information measured by each inertial sensor module.

It is noted that the above steps of the method can be carried out by a receiving processor 104 in the mixed motion capture system, but this embodiment shall not impose a limitation to the scope of the disclosure.

By means of the above mixed motion capture method, the inertia-based position information of the object to be measured can be generated based on the inertial information and the spatial attitude information, and the optics-based position information of the object can be generated based on the image information, and ultimately the inertia-based position information and the optics-based position information can be integrated to thereby obtain the position information of the object to be measured.

In the method, sub-step S6011 or sub-step S6012' can comprises:

receiving the inertial information and the spatial attitude information from each inertial sensor module; and generating the inertia-based position information through a double-integration formula over the acceleration information in the inertial information, wherein the double-integration formula is:

$$P_T = P_0 + \int_0^T v_0 dt + \iint_0^T a_t dt^2;$$

where P represents displacement, v is velocity, a is acceleration, T is termination time, 0 is initial time, t is intermediate time.

In actual implementation of the method, in order to make the calculated inertia-based position information more accurate, the calculated inertia-based position information needs to be corrected or modified based on the biomechanical constraints (e.g. the articulated constraints) and/or the external constraints (e.g. the contact with the ground constraints on the position information). As such, the calculated inertia-based position information is modified based on these above mentioned constraints to thereby generate corrected inertia-based position information.

According to some embodiment of the method, the biomechanical constraints are considered and used for correcting the calculated inertia-based position information, a correction formula for biomechanical constraints is expressed as:

$$P = P_a + K(P_\theta - P_a);$$

where $P_a$ is a displacement of the bone calculated based on the double-integration formula over the acceleration information; $P_\theta$ is a displacement of the same bone calculated based on the relationship among bones, the spatial orientation of each bone, and the spatial position of each base point [?]; K is a scale factor calculated based on the Kaman filter or other approaches, whose size depends on the relative size of an error between $P_a$ and $P_\theta$.

In the above embodiment of the method, only the biomechanical constraints associated with bone-bone connection is utilized for the correction of the displacement, other biomechanical constraints, such as the degrees of freedom for each joint, and the range of relative movement among bones, etc., are skipped herein. Through the biomechanical constraint correction as described above, it is known that such a correction requires the use of the spatial attitude information, which includes information regarding spatial orientation of each bone, and information regarding the spatial position of each base point.

According to some other embodiment of the method, the external constraints are considered and used for correcting the calculated inertia-based position information, and a correction formula for external constraints is expressed as:

$$P' = P + (P_o - P_c);$$

where P' is a corrected displacement of a part of the body, P is a calculated displacement of the part of the body before correction, $P_c$ is a calculated displacement of a part of the body contacting the environment at a contacting point before correction, $P_o$ is a displacement of the environment surrounding the contact point.

For example, if the body of the human is determined to stand on one foot that touches the ground, the calculated displacement of the foot touching the ground ($P_c$) needs to be discounted from the displacement of the ground surrounding the contact point ($P_o$), and difference of the displacement ($P_o - P_c$) is fed back to the calculated displacements of each part of the body (P), to thereby obtain the corrected displacement of the whole body. It is noted that this displacement correction approach as described above can also be applied to the correction of velocity of the whole body having contacts with the floor, as well as to the corrections having other types of contacts with the surrounding environment.

According to some embodiments of the method, step 602 comprises:

receiving image information of the at least one optical marker captured by the optical camera; and generating the optics-based position information based on the image information.

Specifically in the above step 602, by means of the at least two optical cameras 104 to obtain the image information of each of the at least one optical marker 102 from different angles, the spatial coordinates for each moment for each of the at least one optical marker 102 can be obtained, which are then combined to thereby obtain the optics-based position information of each of the at least one optical marker 102.

According to some embodiments of the method, step 603 comprises:

if any one of the at least one optical marker 102 is blocked or any two of the at least one optical marker 102 is overlapped or stacked to one another, generating the position information of the object under measurement based on the corrected inertia-based position information; or if otherwise, generating an estimate of the position information of the object based on both the inertia-based position information and the optics-based position information.

Herein the approach for generating the estimate is as follows: the optics-based position information is given a weight A based on a measurement error a of the optical marker-based system, and the inertia-based position information is given a weight B based on a measurement error b of the inertia-based system. The position information having a relatively smaller measurement error is give a relatively heavier weight, and the position information having a relatively bigger measurement error is give a relatively lighter weight.

According to some embodiment of the method, the respective measurement errors a and b for the optical marker-based system and the inertia-based system are estimated before actual measurement, which are then utilized to calculate the weights A and B for the optics-based position information and the inertia-based position information, respectively, based on the above mentioned formulas (1) and (2).

It is noted that the calculation of the weights A and B is not limited to the above approach, and can be calculated by any approach known to people of ordinary skills in the field, which will be skipped herein.

According to another embodiment of the method, the respective measurement errors a and b for the optical marker-based system and the inertia-based system can be first estimated in a real-time manner by means of a filter algorithm (e.g. Kalman filtering algorithm, etc.), which are then utilized to calculate the respective weights A and B for the optics-based position information and the inertia-based position information in a real-time manner. Herein the calculation for the weights can also utilize the formula (1) and (2).

It is noted that because optics-based measurement has a relatively smaller measurement error compared with inertia-based measurement, the optics-based position information is given a heavier weight. As such, when and if the at least one optical marker 102 is visible to the optical camera 103, the displacement of the object gradually approaches the optics-based position information. When and if there is a block or overlap for the at least one optical marker 102 which causes the optics-based position information to be unavailable, the weight for the optics-based position information is given as 0, and the displacement of the object is solely based on the inertia-based position information.

Because there could be situations where any one of the at least one optical marker 102 is blocked or any two of the at least one optical marker 102 is overlapped or stacked to one another, if the motion capture of an object under measurement is based only on optics-based position information, it is unable to obtain an accurate position information of the object. By means of the inertia-based position information, the above disadvantages of the optics-based position information can be complemented to thereby allow an acquisition of an accurate position information of the object.

By means of the mixed motion capture system and the mixed motion capture method as described above, the position information and orientation information of each part of the body attached with each of the at least one inertial sensor module and each of the at least one optical marker can be determined, which can be combined and analyzed to thereby realize the motion capture of the object.

In order to better understand the various embodiments of the disclosure as described above, two specific embodiments are provided in the following.

In any of the embodiments as described above, the object can be a human body, or can be a moving object. It is noted that in the two specific embodiments, only human body is used as illustrating examples.

Figure 7:
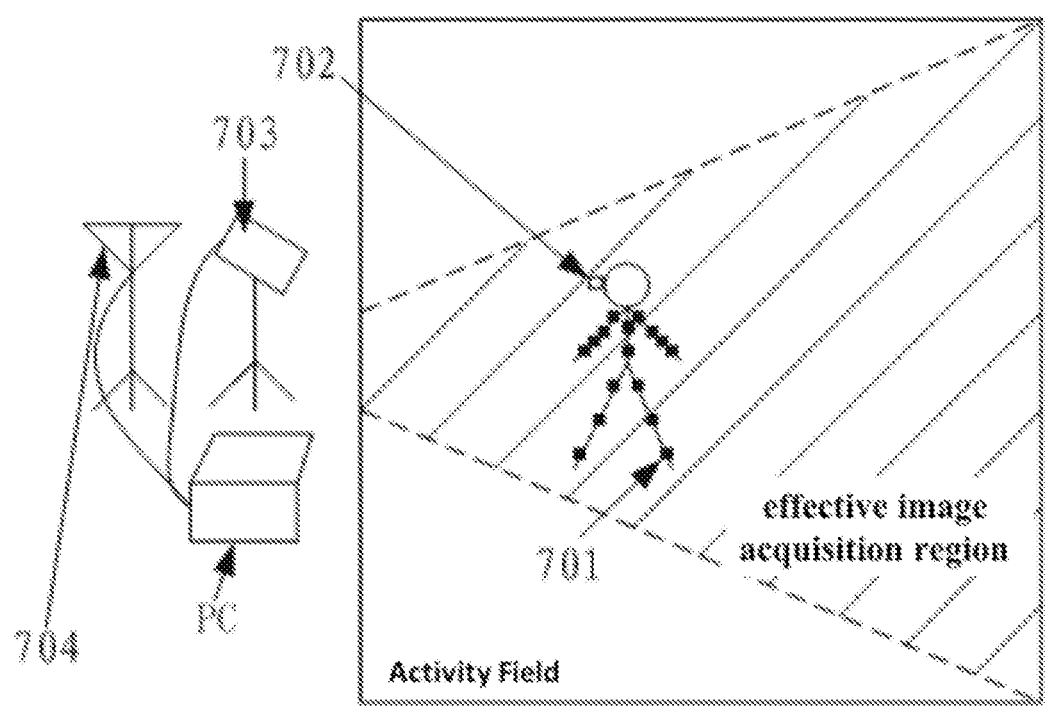
FIG. 7 illustrates a structural diagram of a mixed motion capture system according to a third embodiment of the disclosure.

In a first embodiment of the mixed motion capture system as illustrated in FIG. 7, the mixed motion capture system is primarily based on the inertia-based position information, and secondly based on the optics-based position information.

As shown in the figure, the mixed motion capture system includes a total of 16 inertial sensor modules 701, an inertial marker 702, a binocular camera 703, and a receiving processor. The inertial marker 702 comprises an inertial sensor module and an active optical marker that are integrated therein. Each of the 16 inertial sensor modules 701 and the inertial marker 702 is mounted onto a human body by means of a sensor-equipped jacket and bondages.

Each inertial sensor module 701 includes a three-axis MEMS accelerometer, a three-axis MEMS gyroscope, and a three-axis MEMS magnetometer, a CPU, a RF transceiver, a battery, and a voltage regulator, as illustrated in FIG. 2.

The CPU is configured to process the acceleration information, the angular velocity information, and the terrestrial magnetic vector information obtained by the each inertial sensor module 701 to thereby obtain the spatial attitude information of the each inertial sensor module 701, and then to transmit the inertial information and the spatial attitude information to the receiving processor via the RF transceiver.

The receiving processor includes a RF transceiver 704 and a PC (personal computer) coupled to the RF transceiver 704. The receiving processor is configured, upon receiving the inertial information and the spatial attitude information from the each inertial sensor module 701, to perform a double integration of the acceleration signal to thereby obtain a calculated inertia-based position information of the part of the body wearing the each inertial sensor module 701, and to correct the integral error based on the biomechanical constraints of the human body and the external constraints caused by contacting of the human body to the surrounding environment to thereby obtain the corrected inertia-based position information of the human body (including the position information and the orientation information thereof).

In the inertial marker 702, the active optical marker is an infrared light-emitting diode, which is configured to emit an infrared light powered by the battery and the voltage regulator upon a switch-on of the inertial sensor module.

The binocular camera 703 is mounted onto a tripod that is fixedly arranged in an edging region surrounding the activity field for the human body, to photograph image information over the active optical marker, and to send the image information to the receiving processor via a USB connection.

The receiving processor is configured, upon receiving the image information, to determine the position information of the active optical marker (i.e., the optics-based position information) according to a principle of binocular positioning.

The receiving processor is further configured to integrate the inertia-based position information and the optics-based position information to thereby determine the ultimate spatial position information of the human body.

The following is the specific implementation process.

In the mixed motion capture system as illustrated in FIG. 7, the binocular camera 703 is first mounted onto a tripod that is fixedly arranged in an edging region surrounding the activity field for the human body. Specifically, the binocular camera 703 is arranged such that a location of the binocular camera 703 allows the effective image acquisition region thereof to maximally cover the activity field for the human body, and that a height and a shooting direction of the binocular camera 703 makes the binocular camera 703 to be minimally blocked. According to some embodiments where the inertia marker 702 is installed onto a head of the human body, the binocular camera 703 can be placed at a position higher than the head of the human body (i.e. the binocular camera 703 has a larger distance to the ground than the head of the human body) and tilted down to a certain angle.

The 16 inertial sensor modules 701 and the inertial mark point 702 can be mounted onto the human body by means of a sensor-equipped jacket and straps. Specifically, the inertial marker 702 is bonded onto the head via a strap, and each of the 16 inertial sensor modules 701 is mounted onto the trunk and the limbs (i.e. arms and legs) of the human body via a sensor-equipped jacket and straps. Because the inertial marker 702 is mounted onto the head and the binocular camera 703 is arranged at a position higher than the head, the active optical marker in the inertial marker 702 has a relatively small chance to be blocked.

After installation, the mixed motion capture system can be switched on, and the connection between each part of the system can be established. The human wearing the mixed motion capture system can then perform, based on certain instructions, several calibration movements, such as a T-posture, and a natural standing posture, etc., to thereby allow the installation error for each sensor module to be corrected. The above calibration process is well known to people of ordinary skills in the field and its description is skipped herein.

Figure 8A:
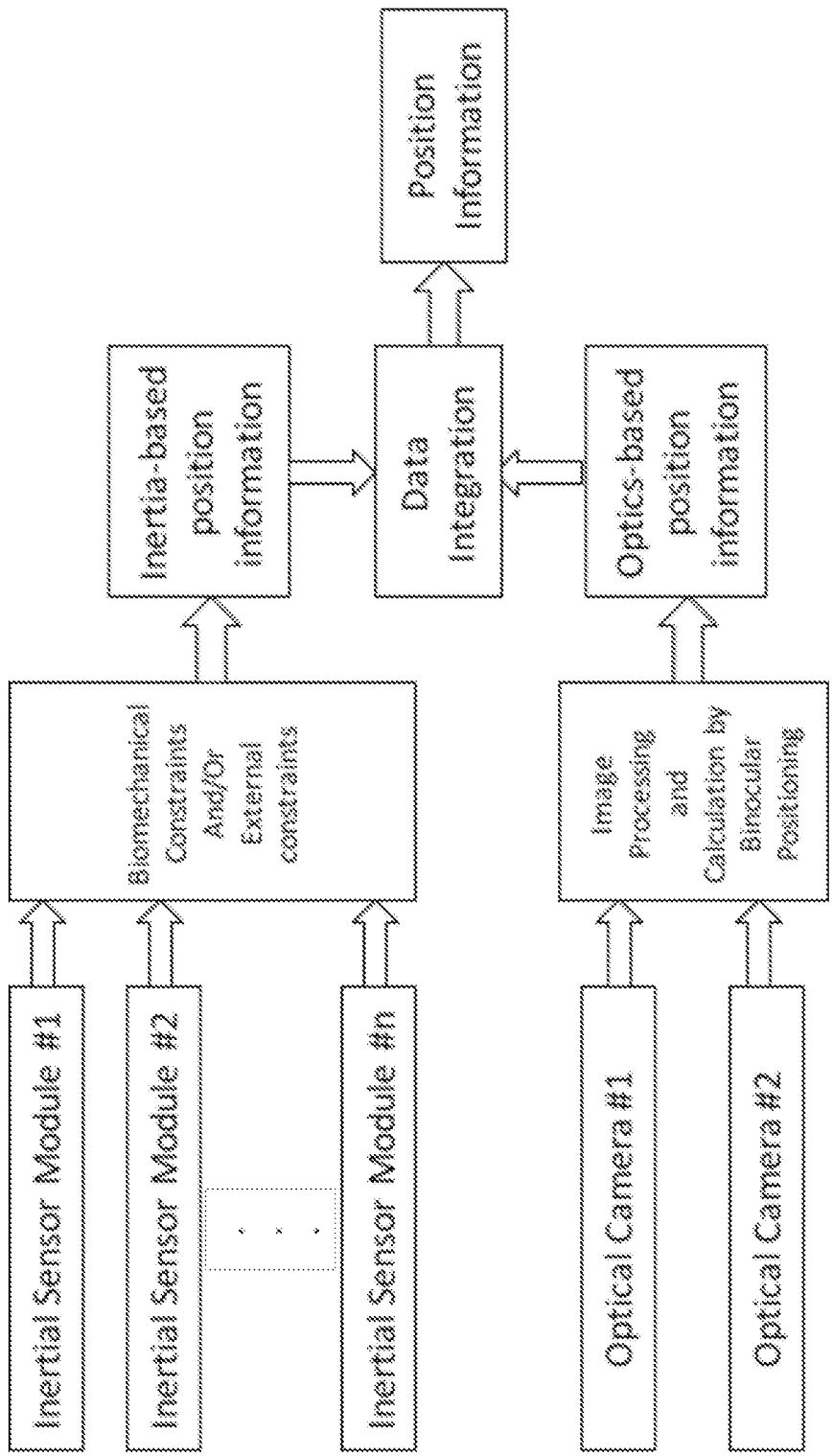
FIG. 8A illustrates a process of human body motion capture and data processing by means of the mixed motion capture system.
Figure 8B:
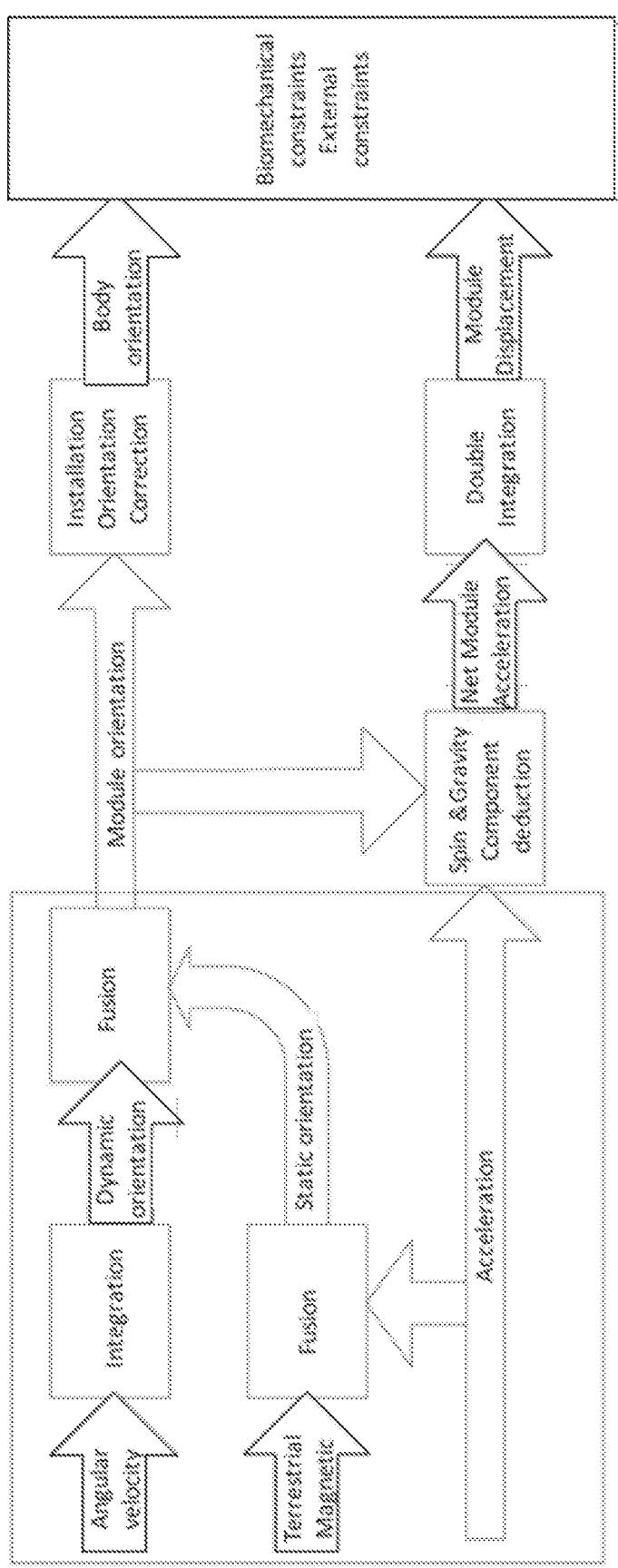
FIG. 8B illustrates a process of data processing in each inertial sensor module as shown in FIG. 8A.

After calibration, the human wearing the mixed motion capture system can freely move and the mixed motion capture system can capture the motions of the human body. A detailed process of motion capture and data processing is shown in FIGS. 8A and 8B.

As shown in FIG. 8, each inertial sensor module (including the inertial sensor module in the inertial marker) can measure the inertial information (i.e. the acceleration information and the angular velocity information) of the part of the human body wearing the each inertial sensor module and the terrestrial magnetic vector information, and the CPU in each of the inertial sensor module can process the inertial information and the terrestrial magnetic vector information to thereby obtain calculated spatial attitude information of the each inertial sensor module. The inertial information and the calculated spatial attitude information is then transmitted to the receiving processor at a surrounding of the activity field through the RF transceiver.

Upon receiving the orientation information and the inertial information from each inertial sensor module, the receiving processor can perform a double integration to the acceleration information to thereby obtain calculated inertia-based position information of the part of the human body wearing each inertial sensor module, and can further perform a correction to the calculated inertia-based position information based on the biomechanical constraints (e.g. the articulated constraints) and/or the external constraints (e.g. the contact with the ground constraints on the position information) to thereby obtain a corrected inertia-based position information.

Due to the angle limitation of the binocular camera 703, the binocular camera 703 can only photograph the active optical marker in the inertial marker 702 within a certain region of the activity field (i.e. the effective image acquisition region), as illustrated in FIG. 7.

The binocular camera 703 can send the image information to the PC through the USB connection. If the PC detects that each of the two cameras of the binocular camera 703 can capture the image information from the active optical marker in the inertial marker 702, the optics-based position information of the inertial marker 702 can be determined according to the binocular positioning principle.

The PC can take the optics-based position information of the inertial marker 702 as a measured position information, and then can integrate the measured position information and the inertia-based position information through certain filtering algorithm (e.g. Kalman filtering algorithm), so that the calculated track of the wearer can smoothly approach the optics-based position information.

If the wearer walks out of the effective image acquisition region or a block of the active optical marker of the inertial marker 702 occurs, the PC is unable to get the optics-based position information, and as such, the mixed motion capture system generates the position information of the wearer based on the inertia-based position information.

This aforementioned first embodiment of the mixed motion capture system has the following advantages. The mixed motion capture system brings about a convenience for setting up the various equipments in the system and for easily changing the activity field, and is affected to a lesser extent by blocking. Furthermore, the mixed motion capture can accurately determine the spatial position of the body of the wearer, and can effectively avoid the integral drift associated with a typical inertial motion capture system.

In a second embodiment, the mixed motion capture system is primarily based on the optics-based position information, and secondly based on the inertia-based position information.

The mixed motion capture system comprises a plurality of optical markers, a plurality of inertial sensor modules, two inertial markers, a plurality of optical cameras fixedly arranged in the surrounding region of an activity field of a wearer, and a receiving processor in the surrounding region of the activity field. Each of the plurality of optical markers is mounted onto a head, a trunk, and a limb (arm or leg) of the wearer, and specifically on a part where it does not slide easily along with an expansion of muscles. Each of the plurality of inertial sensor modules is a highly miniaturized sensor module that is fixedly mounted on some finger joints, or the back of, a hand. Each of the two inertial markers is fixedly mounted onto a hand wrist.

Each of the two inertial markers comprises a three-axis MEMS accelerometer, a three-axis MEMS gyroscope, and a three-axis MEMS magnetometer, a CPU module, a RF transceiver module, a battery, a voltage regulator, and an optical marker. Each of the plurality of optical markers comprises a three-axis MEMS accelerometer, a three-axis MEMS gyroscope, and a three-axis MEMS magnetometer, a CPU module, and a serial communication module.

Each inertial sensor module mounted onto the hands of the wearer can send the captured inertial information and the spatial attitude information of the each inertial sensor module that has been calculated by the CPU module to one of the two inertial markers through a serial communication. The one of the two inertial markers can then transmit the captured inertial information and the calculated spatial attitude information from each inertial sensor module to the receiving processor through the RF transceiver.

Based on the captured inertial information and the calculated spatial attitude information from each inertial sensor module, the receiving processor can calculate the position and orientation of the hand (including the fingers).

Each of the plurality of optical cameras fixedly arranged the activity field can photograph, and to thereby generate image information of, the plurality of optical markers mounted on the various part of the human body of the wearer. Based on the image information obtained from the each of the plurality of optical cameras, the receiving processor can obtain the optics-based position information of each part of the human body of the wearer to thereby be able to capture the motion of the whole body of the wearer.

The receiving processor can further integrate the optics-based position information for the whole body of the wearer and the inertia-based position information for the hands of the wearer, to thereby obtain position information of the whole body.

The following is the specific implementation process.

First, the plurality of optical cameras are set up in the surrounding region of the activity field and calibrated before use. Then the plurality of optical markers, the plurality of inertial sensor modules, and the two inertial markers are mounted on respective parts of the body of the wearer. After mounting, the mixed motion capture system is turned on and the plurality of inertial sensor modules and the two inertial markers are calibrated before use.

The calibration method can be referenced to the method well-known to people of ordinary skills in the field, and can for example, involve the following steps. First, each hand wearing the inertial sensor modules and inertial markers can be put in a special positioning mold arranged at a specified position and in a specified direction. Second, the based on the calibration buttons in the operation interface on the receiving processor, the receiving processor can calibrate the installation error for each inertial sensor module based on the actual position of each bone of the hand and the position and orientation measured by the each inertial sensor module. Other calibration method is also possible, and there are no limitations herein.

After calibration, the wearer can perform any motion in the activity field. Each of the plurality of optical cameras can photograph the plurality of optical markers mounted on the various parts of the body, and can transmit the image information from the each of the plurality of optical cameras to the receiving processor in a real-time manner. The receiving processor can further process the image information from the each of the plurality of optical cameras to thereby generate the optics-based position information of the whole body of the wearer.

Each of the plurality of inertial sensor modules can transmit the captured inertial information and the calculated spatial attitude information to the receiving processor in a real-time manner. The receiving processor can then obtain the position and orientation information of the hand based on the biomechanical constraints (e.g. the articulated constraints) and/or the external constraints (e.g. the contact with the ground constraints on the position information).

Because each inertial marker comprises an optical marker and an inertial sensor module that are integrated together, based on the information obtained respectively from the optical marker and the inertial sensor module, the integral error for the inertial sensor module can thus be obtained, which can then be used for acquisition of accurate position information of the hand.

The accurate position information of the hand and the above optics-based position information can be combined to thereby obtain an accurate position information of the whole body (including the hands) of the wearer.

In this second embodiment of the mixed motion capture system as described above, the motions of block-prone hands are captured by inertial sensor modules, whereas the motions of other parts of the body are captured by optical markers having relatively more accuracy, and the inertial markers having an optical marker and an inertial sensor module integrated therein are utilized to assist in the data integration. As such, the mixed motion capture system disclosed herein allows the combination of advantages of the optical motion capture technology and of the inertial motion capture technology, leading to an accurate capture of motions, including especially the fine movements, of the human body.

People of ordinary skills in the field shall understand that the various embodiments of the disclosure as described above shall cover the methods, systems, or computer program products. Therefore, the invention can be applied to cases of pure hardwares, pure softwares, or a combination of hardwares and softwares. Moreover, the invention can also be applied to a computer program product, which contains a computer executable program code in a computer storage media (including, but not limited to, CD-ROM, optical disk storage, memory, etc.).

The invention is described with reference to the method and the system (or device), and to the flow chart and/or block diagram of a computer program product according to the embodiments of the present disclosure. It is noted that each and every, as well as a combination of, processes and/or boxes in the flow chart and the block diagram can be realized by one or more computer program instructions. The one or more computer program instructions can be provided to a general computer, a specialized computer, an embedded processor, or a programmable data processor, to produce a machine, which can perform a specified action to thereby realize the functionalities of each and every, as well as a combination of, processes and/or boxes in the flow chart and the block diagram.

The one or more computer program instructions can also be stored in a computer readable memory that can guide a computer or a programmable data processor to work in a specified manner. The one or more computer program instructions stored in the computer readable memory can be used to generate an instruction device, which in turn can realize the functionalities of each and every, as well as a combination of, processes and/or boxes in the flow chart and the block diagram.

The computer program instructions can also be uploaded to a computer or a programmable data processor, such that the computer or the programmable data processor can perform a series of actions to generate a series of processes, which in turn can realize the functionalities of each and every, as well as a combination of, processes and/or boxes in the flow chart and the block diagram.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A mixed motion capture system for capturing motions of an object, comprising:
    a receiving processor;
    at least one inertial sensor module mounted on the object, each wirelessly coupled to the receiving processor and configured to obtain, and to send to the receiving processor, inertial information and spatial attitude information thereof; at least one optical marker mounted on the object; and
    at least two optical cameras arranged in a surrounding region of the object, each coupled to the receiving processor and configured to photograph, and to send to the receiving processor, image information of each of the at least one optical marker;
    wherein:
    the receiving processor is configured to generate inertia-based position information based on the inertial information and the spatial attitude information from each of the at least one inertial sensor module, and optics-based position information based on the image information from each of the at least one optical marker, and to integrate the inertia-based position information and the optics-based position information to thereby obtain position information of the object; and
    each of the at least one inertial sensor module comprises:
    a three-axis microelectromechanical systems (MEMS) accelerometer, configured to measure acceleration information;
    a three-axis MEMS gyroscope, configured to measure angular velocity information thereof; and a three-axis MEMS magnetometer, configured to obtain terrestrial magnetic vector information thereof;
    a first CPU, coupled with each of the three-axis MEMS accelerometer, the three-axis MEMS gyroscope, and the three-axis MEMS magnetometer, and configured to generate dynamic spatial orientation information by integrating the angular velocity information, to generate static absolute spatial orientation information based on the acceleration information and the terrestrial magnetic vector information, and to utilize the static absolute spatial orientation information to correct the dynamic spatial orientation information to thereby generate spatial attitude information; and a first radio frequency (RF) transceiver coupled to the first CPU, configured to transmit the spatial attitude information and inertial information comprising the acceleration information and angular velocity information to the receiving processor.

2. The mixed motion capture system according to claim 1, further comprising at least one inertial marker, each comprising one of the at least one inertial sensor module and one of the at least one optical marker integrated therein.

3. The mixed motion capture system according to claim 2, wherein the receiving processor is further configured to correct the inertia-based position information based on at least one of a biomechanical constraint and an external constraint to thereby generate corrected inertia-based position information, and to obtain the position information of the object by integrating the corrected inertia-based position information and the optics-based position information.

4. The mixed motion capture system according to claim 3, wherein the receiving processor is configured, during integration of the corrected inertia-based position information and the optics-based position information:
if any one of the at least one optical marker is blocked or any two of the at least one optical marker is overlapped to one another, to generate the position information of the object based on the corrected inertia-based position information; or else
to obtain a measurement error a of the at least one optical marker and a measurement error b of the at least one inertial sensor module, to calculate a weight A for the optics-based position information and a weight B for the corrected inertia-based position information based on the measurement error a and the measurement error b respectively, and to generate the position information of the object based on the weight A and the weight B.

5. The mixed motion capture system according to claim 4, wherein the weight A and the weight B are calculated based on:

$$A = \frac{|b|}{|a| + |b|}; \text{ and}$$

$$B = \frac{|a|}{|a| + |b|}.$$

6. The mixed motion capture system according to claim 4, wherein the receiving processor is configured to estimate the measurement error a and the measurement error b in a real-time manner by means of a filtering algorithm.

7. The mixed motion capture system according to claim 6, wherein the filtering algorithm is Kalman filtering algorithm.

8. The mixed motion capture system according to claim 4, wherein the at least one optical marker comprises at least one reflective passive optical marker.

9. The mixed motion capture system according to claim 4, wherein the at least one optical marker comprises at least one luminous active optical marker.

10. The mixed motion capture system according to claim 9, wherein the at least one luminous active optical marker comprises an infrared illuminator.

11. The mixed motion capture system according to claim 4, wherein the at least two cameras comprise a plurality of separately disposed monocular cameras, each fixedly arranged, or mounted onto a tripod disposed in a surrounding region of the object.

12. The mixed motion capture system according to claim 4, wherein the at least two cameras comprise at least one binocular camera or at least one multiocular camera, fixedly arranged, or mounted onto a tripod disposed, in a surrounding region of the object.

13. A mixed motion capture method utilizing the mixed motion capture system according to claim 1, comprising:
generating the inertia-based position information based on the inertial information and the spatial attitude information measured by each of the at least one inertial sensor module and the optics-based position information based on the image information of the at least one optical marker captured by each of the at least two optical cameras; and
integrating the inertia-based position information and the optics-based position information to thereby obtain the position information of the object.

14. The mixed motion capture method according to claim 13, wherein the generating the inertia-based position information based on the inertial information and the spatial attitude information measured by each of the at least one inertial sensor module and the optics-based position information based on the image information of the at least one optical marker captured by each of the at least two optical cameras comprises:
generating the inertia-based position information based on the inertial information and the spatial attitude information measured by each of the at least one inertial sensor module; and
generating the optics-based position information based on the image information of the at least one optical marker captured by each of the at least two optical cameras.

15. The mixed motion capture method according to claim 14, wherein:
the generating the inertia-based position information based on the inertial information and the spatial attitude information measured by each inertial sensor module comprises:
generating calculated inertia-based position information through a double integration over the acceleration information in the inertial information; and
correcting the calculated inertia-based position information based on at least one of a biomechanical constraint and an external constraint to thereby generate corrected inertia-based position information; and
the integrating the inertia-based position information and the optics-based position information to thereby obtain the position information of the object comprises:
integrating the corrected inertia-based position information and the optics-based position information to thereby obtain the position information of the object.

16. The mixed motion capture method according to claim 15, wherein the integrating the corrected inertia-based position information and the optics-based position information to thereby obtain the position information of the object comprises:
generating the position information of the object based on the corrected inertia-based position information if any one of the at least one optical marker is blocked or any two of the at least one optical marker is overlapped to one another; or else
obtaining a measurement error a of the at least one optical marker and a measurement error b of the at least one inertial sensor module, calculating a weight A for the optics-based position information and a weight B for the corrected inertia-based position information based on the measurement error a and the measurement error b respectively, and generating the position information of the object based on the weight A and the weight B.

17. The mixed motion capture method according to claim 16, wherein the weight A and the weight B are calculated based on:

$$A = \frac{|b|}{|a| + |b|}; \text{ and}$$

$$B = \frac{|a|}{|a| + |b|}.$$

18. The mixed motion capture method according to claim 16, wherein the obtaining a measurement error a of the at least one optical marker and a measurement error b of the at least one inertial sensor module comprises:
estimating the measurement error a and the measurement error b in a real-time manner by means of a filtering algorithm.

19. The mixed motion capture method according to claim 18, wherein the filtering algorithm is Kalman filtering algorithm.

* * * * *